United States Patent Office 3,733,368
Patented May 15, 1973

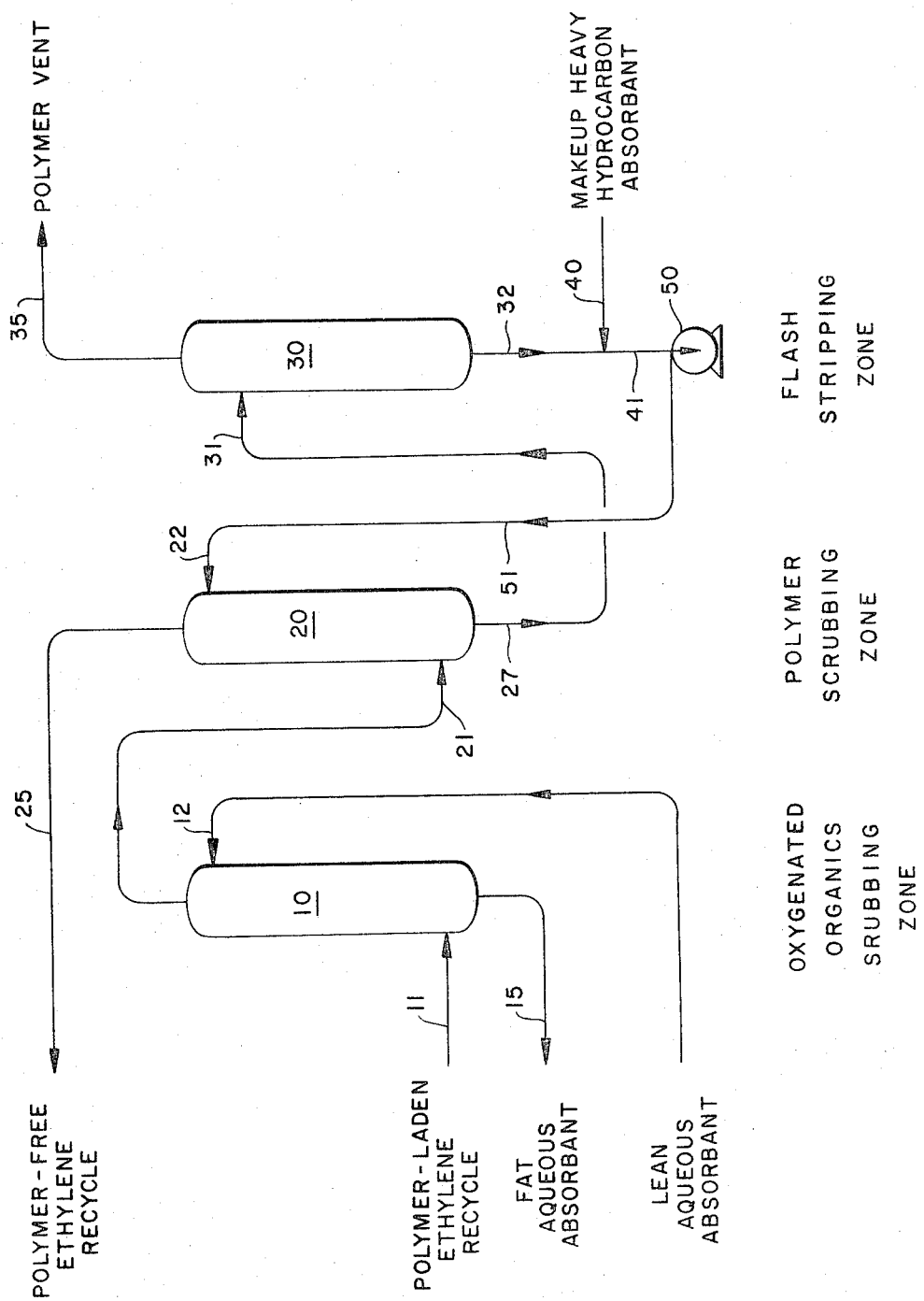

3,733,368
PROCESS FOR THE SEPARATION OF POLYMERS FROM A RECYCLE STREAM THAT CONTAINS ETHYLENE
Delwin E. Dodd, San Ramon, Kuei-Jung Li, Oakland, and Robert A. Golding, San Rafael, Calif., assignors to Shell Oil Company, New York, N.Y.
Filed July 2, 1971, Ser. No. 159,326
Int. Cl. C07c 11/12
U.S. Cl. 260—677 A                       10 Claims

ABSTRACT OF THE DISCLOSURE

Contaminating quantities of $C_4+$ hydrocarbon polymers are removed from recycle ethylene in the process for catalytic hydration of ethylene by
(a) washing at least a portion of the total gaseous recycle stream with an aqueous absorbant in a first scrubbing zone to produce a polymer-rich ethylene overhead; and
(b) scrubbing the polymer-rich ethylene with a lean, heavy hydrocarbon absorbant in a second scrubbing zone to produce an ethylene overhead substantially free of polymers.

BACKGROUND OF THE INVENTION

This invention relates to the catalytic hydration of ethylene to ethanol. More particularly, it deals with the removal of impurities produced in the hydration reaction or introduced thereto in the feeds. Specifically, a processing sequence is disclosed which permits removal of ethane, ethanol, diethyl ether, and $C_4+$ hydrocarbon polymers, from recycle ethylene unconverted in the hydration.

THE PRIOR ART

Synthetic ethanol is manufactured by passing water and ethylene, at a molar ratio of about 0.5–0.9:1, over phosphoric acid or other catalysts supported on an inert carrier at a temperature of about 270–310° C., a pressure of about 880–1250 p.s.i., and at a space velocity of about 725–1900 hours$^{-1}$. Processes for effecting the hydration and the catalysts employed therein are well known. The operation of an industrial facility for hydrating ethylene in the presence of a phosphoric acid catalyst has been described by Nelson and Courter, Chemical Engineering Progress, 50(10): 526–531 (October 1954).

Although under the typical hydration conditions the conversion of ethylene is low, generally less than 10%, the ultimate selectivity to ethanol is high, usually above about 95%. Small amounts of by-products are formed in other reactions, the primary side reaction being the equilibrium dehydration of ethanol to diethyl ether. Acetaldehyde and crotonaldehyde have been observed in process streams, and in addition, a small amount of ethylene, about 1–2%, polymerizes to form a wide range of hydrocarbon polymers.

While not free from uncertainty, the formation of $C_4+$ hydrocarbon polymers, i.e., those containing at least 4 carbon atoms per molecule, appears to proceed via a carbonium ion mechanism as shown by Equations I–III, wherein $C_n*$ represents a reacting carbonium ion:

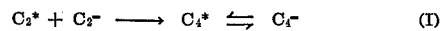
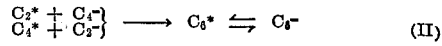

The olefins produced by reactions I–III may be hydrogenated to paraffins or hydrated to the corresponding alcohols. Similar reactions appear to account for the formation of higher molecular weight polymers. The lower polymers which form are gaseous under the above-indicated reaction conditions, and build up in the circulating stream of ethylene to an equilibrium level, i.e., the level where net production of each polymer species is balanced by the rejection from the system, as, for example, in the high pressure bleed and with the ethanol-water stream, as shown in Nelson and Courter. Unless the lower hydrocarbon polymers, i.e., those having four to about 10 carbon atoms, are removed from the system, serious operating difficulties occur in the hydration reactor itself, as well as in downstream process units due to the formation of higher molecular weight polymers. The presence of undue quantities of higher molecular weight materials results in the formation of incrustations on the entrance to the heat exchanger which cools the hydration reactor effluent and in fouling of the catalyst bed, compressor parts or downstream distillation columns.

One method for removing hydrocarbon polymers which are formed during the hydration is disclosed by Nelson and Courter, supra, who disclose the use of makeup ethylene at a concentration of 97%. Under these conditions, the hydrocarbon fed to the hydration reactor will normally have an ethane content of 10–15% m. The hydration reactor product is cooled and partially condensed, the vapor therefrom being further cooled and scrubbed with water. The scrubbed vapor contains sufficient ethane such that a vented portion carries with it the hydrocarbon polymer produced in the hydration reactor. However, if a higher concentration of feed ethylene is employed, i.e., about 99.5%+, the ethane content of the circulating ethylene will be reduced to about 1–3% m. If a portion of that scrubber overhead is vented, as in Nelson and Courter, too much ethylene will be lost, thus contributing to poor economic performance of the process, without removing all the hydrocarbon polymers which are formed.

Rindtorff et al., Canadian Pat. 703,171, prevent introduction of polymeric materials into the recycle ethylene by washing the entire hydration reactor product first with aqueous ethanol and then with water. Other solvents which are said to be useful in the first stage of washing include isopropanol, butanol, acetone, ether, benzol, toluene, and even the hydrocarbon polymers which are to be removed from the recycle ethylene stream. Although this processing sequence is said to prevent the offending hydrocarbon polymers from entering the ethylene to be recycled to the hydration reactor, they join the aqueous ethanol stream which is to be purified downstream. As noted above, these materials will form tarry incrustations in downstream facilities.

BRIEF SUMMARY OF THE INVENTION

It has now been found that in the process of catalytic hydration of ethylene, $C_4+$ hydrocarbon polymers are removed from recycle ethylene by (a) contacting at least a portion of the total gaseous recycle ethylene stream with an aqueous absorbant in a first scrubbing zone to produce a polymer-rich overhead; and (b) contacting the polymer-rich ethylene with a lean, heavy hydrocarbon absorbant in a second scrubbing zone to produce a recycle ethylene overhead substantialy free of polymers.

In a preferred modification, the absorbant is recovered by stripping the fat, polymer-laden hydrocarbon absorbant to produce an overhead polymer vent and a lean bottoms absorbant which is recycled to the second scrubbing zone.

BRIEF DESCRIPTION OF THE DRAWING

The accompanying drawing diagrammatically illustrates a preferred embodiment of the present invention. Shown therein are a first, or oxygenated organics, scrubbing zone, a second, or polymer, scrubbing zone, and a stripping, or flash, zone, and their interconnections. Pieces of equipment, such as pumps, surge vessels, accumulators and the like which are not essential for an understanding of the invention, have been omitted for purposes of clarity.

DETAILED DESCRIPTION OF THE INVENTION

The process of the present invention is particularly suitably applied to the vapor stream produced by partially condensing, extractively distilling, or similarly treating the effluent from the phosphoric acid-catalyzed hydration of ethylene. It may also be employed for treating ethylene recycle unconverted over other hydration catalysts. Generally the molar composition of this total recycle ethylene stream will comprise up to about 15% ethane, up to about 95% ethylene, up to about 5% polymer, and less than about 10% diethyl ether, 2% ethanol, and 2% water.

The process of the present invention may be employed in known processes wherein $C_4+$ polymer is to be removed from circulating ethylene streams containing as much as 10-15% m. ethane. However, in a preferred embodiment, it is applied in a particularly advantageous manner to the removal of $C_4+$ polymer from ethylene recirculation loops containing less than about 2% m. ethane, to which high purity makeup ethylene, i.e., above about 99.5% m., is added.

Generally the hydrocarbon polymers to be removed from the recycle ethylene will contain eight carbon atoms or less. A typical analysis of the hydrocarbon polymers in a recycle ethylene stream indicated approximately 53–54% $C_4$'s, approximately 45% $C_6$'s, and 1–2% $C_8$'s. Other polymer mixtures may occur, due to varying catalyst, temperature, pressure, and space velocity conditions, as well as to the method and efficiency of polymer removal.

The proportion of the total recycle ethylene stream to be treated by the present invention may vary over wide limits and will depend upon such factors as the type of catalyst and its support, the temperature, pressure, and space velocity maintained within the reactor, as well as the amount and carbon number distribution of polymer formed therein. Generally it has been found that no more than about 5% of the total recycle ethylene stream need be treated by the process of the present invention in order to remove polymer as formed. Desirably, about 2% or less of the total recycle ethylene stream is fed to the present processing sequence.

In operating the present invention, at least a portion of the total recycle ethylene stream is fed to a first, or oxygenated organics, scrubbing zone, wherein it is contacted with a lean aqueous absorbent. The purpose of this first scrubbing zone is to remove oxygenated materials from the bleed recycle ethylene stream and effect an initial separation of the hydrocarbon polymers from other typically occurring impurities. Thus, the bottom product from the first scrubbing zone will comprise a fat aqueous absorbant comprising water in admixture with diethyl ether, ethanol, and trace amounts of other oxygenated materials present in the recycle ethylene bleed. The overhead from the first scrubbing zone will comprise ethylene, ethane, and $C_4+$ hydrocarbon polymers, essentially free of oxygenated materials.

The first scrubbing zone is generally operated at high pressure, i.e., generally at or slightly below the pressure maintained within the hydration reactor. This will generally be from about 800 to about 1200 p.s.i. The temperatures maintained within the scrubbing zone will be on the order of about 15 to about 75° C. The lean aqueous absorbant fed to the first scrubbing zone preferably comprises water, but alternatively consists of aqueous ethanol or ether fractions. Within the first scrubbing zone, the ratio of lean aqueous absorbant to polymer-laden ethylene recycle is not critical, as long as the oxygenated materials contained in the latter are removed. Generally, it has been found that contacting one mole of polymer-laden ethylene recycle with no more than about 10 moles of lean aqueous absorbant is sufficient to produce an overhead essentially free of oxygenated materials.

The $C_4+$ hydrocarbon polymers are removed from the first scrubbing zone overhead by contact with a lean, heavy hydrocarbon absorbant in a second, or polymer, scrubbing zone. The heavy hydrocarbon absorbant must have a boiling point greater than the heaviest polymer to be removed, i.e., one containing about 8 to 10 carbon atoms, and must be inert under conditions prevailing within the second scrubbing zone. The preferred heavy hydrocarbon absorbant is characterized as an inert hydrocarbon fraction or compound having a molecular weight equivalent to or greater than $C_{16}$ paraffins, with a correspondingly lower vapor pressure. Generally, the heavy hydrocarbon absorbant should have an atmospheric boiling point above about 285° C., although the petroleum fraction boiling between kerosene and spindle oil, commonly referred to as light gas oil, may also be employed.

Generally the pressure maintained within the second scrubbing zone will be below that maintained in the first. This will typically correspond to a pressure of about 300 to about 900 p.s.i.

Efficient removal of a major proportion of the hydrocarbon polymers from the first scrubbing zone overhead is dependent upon contacting this stream with a sufficient quantity of heavy hydrocarbon absorbant in the second scrubbing zone. Care must be taken not to circulate too much heavy hydrocarbon absorbant through the second scrubbing zone; otherwise, an economically unacceptable amount of ethylene will be absorbed in the circulating absorbant and thus be removed from the system along with the $C_4+$ polymers, as hereinafter described. On the other hand, if too little heavy hydrocarbon absorbant is circulated, an insufficient quantity of $C_4+$ polymer will be removed from the first scrubbing zone overhead. This, in turn, will lead to the buildup of $C_4+$ polymers in the ethylene recycle loop, as well as to the formation of heavy hydrocarbon polymers which foul both the hydration catalyst and downstream processing equipment. The rate of heavy hydrocarbon absorbant circulation will be determined by such factors as the temperature and pressure maintained within the hydration reactor, the amount of ethane present in the makeup ethylene feed, the rate of polymer formation, the polymer concentration in the ethylene recycle loop, and the degree of polymer removal desired. Generally, about 0.005 to about 0.2 mole of heavy hydrocarbon absorbant per mole of first scrubbing zone overhead is circulated through the second scrubbing zone.

A preferred circulation rate corresponds to about 0.03 to about 0.1 mole/mole. Under these conditions, buildup of polymer within the system will not occur, nor will heavy hydrocarbon absorbant be overheaded in the second scrubbing zone and recycled to the hydration reactor.

In a preferred embodiment of the process, the polymer is separated from the hydrocarbon absorbant, and the absorbant is recycled to the second scrubbing zone. The polymer in the fat hydrocarbon absorbant may be removed therefrom in a variety of ways. In a preferred method, the fat hydrocarbon absorbant is heated and thereafter flashed at a reduced pressure to produce a polymer vent overhead and a lean, heavy hydrocarbon absorbant bottoms which is suitable for recycle to the second scrubbing zone. Another method for removing the polymer from the bottoms of the second scrubbing zone is to contact it with an inert stripping gas, for example nitrogen or ethane. When the polymer is removed from the bottoms of the second scrubbing zone by flashing, this is suitably carried out at a pressure from about 0 to about 100 p.s.i.g. Prior to recycling the lean, heavy hydrocarbon absorbant from the flashing zone back to the second scrubbing zone, the lean heavy hydrocarbon absorbant may be cooled so as to absorb the $C_4+$ hydrocarbon polymer more efficiently.

DETAILED DESCRIPTION OF THE DRAWING

A fuller understanding of the present invention may be obtained by reference to the accompanying drawing. Nonessential pieces of equipment, such as pumps, surge vessels, and the like have been omitted for purposes of clarity.

Referring to the drawing, a polymer-laden ethylene recycle stream, comprising a portion of the total ethylene unconverted in the hydration reactor, enters the process through line 11, and is contacted against a lean aqueous absorbant, flowing in line 12, within first scrubbing zone 10. A fat aqueous absorbent, flowing in line 15 leaves as bottoms from first scrubbing zone 10, and contains virtually all the oxygenated materials fed in line 11. This fat absorbant may be treated to recover the contained ethanol and diethyl ether. The overhead from first scrubbing zone 10, comprising ethylene in admixture with ethane and $C_4+$ hydrocarbon polymers, passes to the second or polymer scrubbing zone 20 through line 21. Within second scrubbing zone 20, $C_4+$ hydrocarbon polymers are removed from the first scrubbing zone overhead by contact with a lean, heavy hydrocarbon absorbant, introduced to the second scrubbing zone 20 via line 22. The overhead from second scrubbing zone 20, flowing in line 25, is a polymer-free ethylene stream, suitable for recycle to the hydration reactor. The bottoms from second scrubbing zone 20, flowing in line 27, passes to flash stripping zone 30 through line 31. Within flash stripping zone 30 a separation is effected between polymer, vented via line 35, and a lean, polymer-free, heavy hydrocarbon absorbant bottomed via line 32. Makeup, heavy hydrocarbon absorbant may be added when required to the bottoms from flash stripping zone 30 via line 40. Lean, heavy hydrocarbon absorbant is returned to second scrubbing zone 20 by passage through line 41, pump 50, and lines 51 and 22.

ILLUSTRATIVE EMBODIMENT

In a typical operation, about 2% of the ethylene unconverted in the phosphoric acid-catalyzed hydration of ethylene, i.e., 100 moles/hour, containing about 89% m. ethylene, about 1% m. ethane, and about 2% m. polymer, is processed according to the present invention. Other components contained in the polymer-laden ethylene recycle stream flowing in line 11 include oxygenated organics, such as diethyl ether and ethanol, and water. With reference to the drawing, approximate pressures and temperatures maintained within first scrubbing zone 10, second scrubbing zone 20, and flash stripping zone 30 are indicated in Table I. Compositions of various streams are shown in Table II.

TABLE I

| Item | Temp., °C. Top | Temp., °C. Bot. | Top pressure, p.s.i.g. |
|---|---|---|---|
| Oxygenated organics scrubbing zone 10 | 35 | 55 | 945 |
| Polymer scrubbing zone 20 | 35 | 40 | 475 |
| Flash stripping zone 30 | 40 | 40 | 75 |

TABLE II

| Stream | 12 | 15 | 25 | 35 |
|---|---|---|---|---|
| Temp., °C | 35 | 55 | 35 | 40 |
| Pressure, p.s.i.g | 945 | 945 | 475 | 75 |
| Flow, moles/unit time, basis 100 moles feed, stream 11 | 950 | 960 | 80 | 10 |
| Composition, percent m.: | | | | |
| Ethane | | | 1.0 | 1.7 |
| Ethylene | | | 98.6 | 81.4 |
| Polymer | | | 0.4 | 16.9 |
| Oxygenated organics | | 0.7 | Tr. | |
| Water | 100 | 99.3 | Tr. | |

We claim as our invention:

1. The process of separating $C_4+$ hydrocarbon polymers from a recycle stream containing ethane and ethylene unconverted in a hydration reactor for the catalyzed hydration of ethylene to ethanol, which process comprises
   (a) contacting at a pressure from about 800 to about 1200 p.s.i. at least a portion of the total recycle ethylene stream with an aqueous absorbant selected from the group consisting of water, aqueous ethanol and diethyl ether in a first scrubbing zone, thereby producing an aqueous bottoms and a polymer-rich ethylene stream as overhead; and
   (b) contacting said polymer-rich ethylene stream with a lean, heavy hydrocarbon absorbant selected from the group consisting of inert hydrocarbon fractions, hydrocarbon compounds and light gas oils having a molecular weight equivalent to or greater than $C_{16}$ paraffins in a second scrubbing zone to produce an ethylene overhead substantially free of polymers.

2. The process of claim 1 wherein ethane content of the total recycle stream is as much as 15% m.

3. The process of claim 1 wherein up to about 5% of the total recycle ethylene stream is fed to the first scrubbing zone.

4. The process of claim 1 wherein each mole of polymer-rich ethylene overheaded in the first scrubbing zone is contacted with from about 0.005 to about 0.2 mole of said lean, heavy hydrocarbon absorbant in the second scrubbing zone.

5. The process of claim 1 wherein the heavy hydrocarbon absorbant has an atmospheric boiling point above about 285° C.

6. The process of claim 1 wherein the polymer is separated from the second scrubbing zone bottoms and the absorbant is recovered and recycled to the second scrubbing zone for contacting with additional polymer-rich ethylene.

7. The process of claim 6 wherein the polymer is separated by stripping the second scrubbing zone bottoms in a flash zone, at a pressure of from about 0 to about 100 p.s.i.g.

8. The process of claim 6 wherein the polymer is separated by contacting the second scrubbing zone bottoms with a stripping vapor selected from the group consisting of nitrogen and ethane.

9. The process of claim 1 wherein said aqueous absorbant is water.

10. The process of claim 1 wherein said lean, heavy hydrocarbon absorbant is a petroleum light gas oil fraction.

References Cited
UNITED STATES PATENTS

| | | | |
|---|---|---|---|
| 2,470,222 | 5/1949 | Patterson | 203—43 |
| 2,533,675 | 12/1950 | Marschner | 203—44 |
| 3,272,885 | 9/1966 | Davison | 260—677 A |
| 1,960,204 | 5/1934 | Davis | 208—101 |
| 1,868,204 | 7/1932 | Herthel | 208—101 |
| 3,660,515 | 5/1972 | Rogers | 260—681.5 |
| 3,485,879 | 12/1969 | Mameniskis et al. | 260—643 |

DELBERT E. GANTZ, Primary Examiner

J. M. NELSON, Assistant Examiner

U.S. Cl. X.R.

208—103; 203—43, 45; 260—641